(12) United States Patent
Goto et al.

(10) Patent No.: US 6,730,872 B2
(45) Date of Patent: May 4, 2004

(54) METHOD OF AND APPARATUS FOR WIRE ELECTRIC-DISCHARGE MACHINING

(75) Inventors: Akihiro Goto, Tokyo (JP); Tatsushi Sato, Tokyo (JP); Toshio Nakashima, Tokyo (JP); Junichi Shibata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/132,400

(22) Filed: Apr. 26, 2002

(65) Prior Publication Data

US 2003/0098294 A1 May 29, 2003

(30) Foreign Application Priority Data

Nov. 29, 2001 (JP) .......................... 2001-364999

(51) Int. Cl.[7] .............................. B23H 1/02; B23H 7/06; B23H 7/10
(52) U.S. Cl. ................................ 219/69.12; 219/69.13; 219/69.16
(58) Field of Search .................... 219/69.12, 69.13, 219/69.16

(56) References Cited

U.S. PATENT DOCUMENTS

| 4,581,513 A | * | 4/1986 | Obara et al. ............. 219/69.12 |
| 5,689,427 A | * | 11/1997 | Li et al. .................... 219/69.12 |
| 5,756,956 A | * | 5/1998 | Sato et al. ................ 219/69.12 |

FOREIGN PATENT DOCUMENTS

| JP | 59-76724 A | * | 5/1984 | .............. 219/69.12 |
| JP | Sho 61-121820 | | 6/1986 | |
| JP | Hei 2-198714 | | 8/1990 | |
| JP | Hei 5-212618 | | 8/1993 | |
| JP | Hei 7-246519 | | 9/1995 | |
| JP | PCT-JP01-09577 | | 11/2001 | |

* cited by examiner

Primary Examiner—Geoffrey S. Evans
(74) Attorney, Agent, or Firm—Sughrue Mion, PLLC

(57) ABSTRACT

The wire electric-discharge machining apparatus is provided with an inter-pole voltage correction unit 109 which corrects a voltage corresponding to an inter-pole voltage according to a correction coefficient which increases with an elongation of discharge stop time. A corrected voltage corresponding to the inter-pole voltage output from the inter-pole voltage correction unit 109 is given to a control unit 106 to allow a wire electrode 101 and a workpiece 102 to relatively move according to the corrected voltage corresponding to the inter-pole voltage.

16 Claims, 12 Drawing Sheets

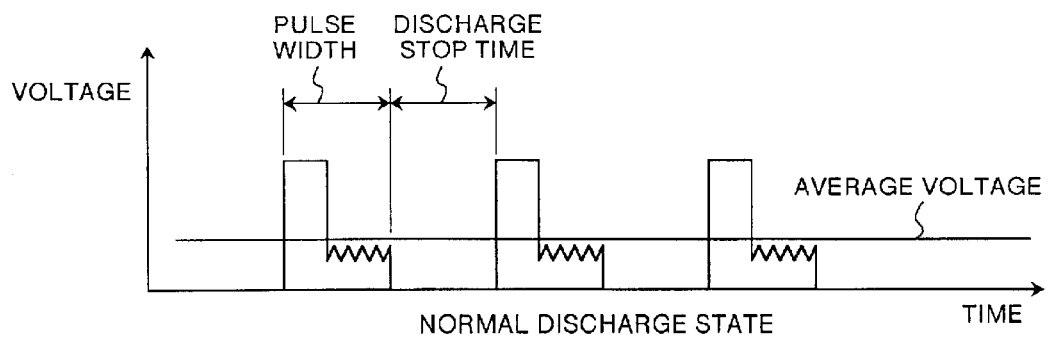
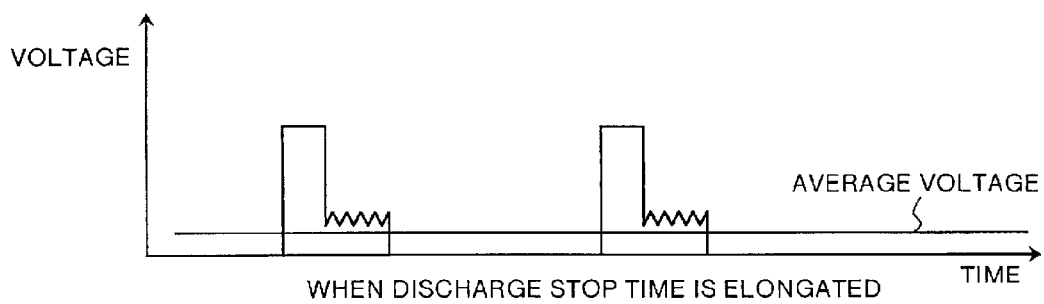

| DISCHARGE STOP TIME | DETECTED VOLTAGE | CORRECTION COEFFICIENT | CORRECTED VOLTAGE | DRIVE SPEED |
|---|---|---|---|---|
| $t_{oa}$ | $V_{ga}$ | Ka | $V_{ga} \times Ka$ | $v_a$ |
| $t_{ob}$ | $V_{gb}$ | Kb | $V_{gb} \times Kb$ | $v_a$ |
| $t_{oc}$ | $V_{gc}$ | Kc | $V_{gc} \times Kc$ | $v_a$ |

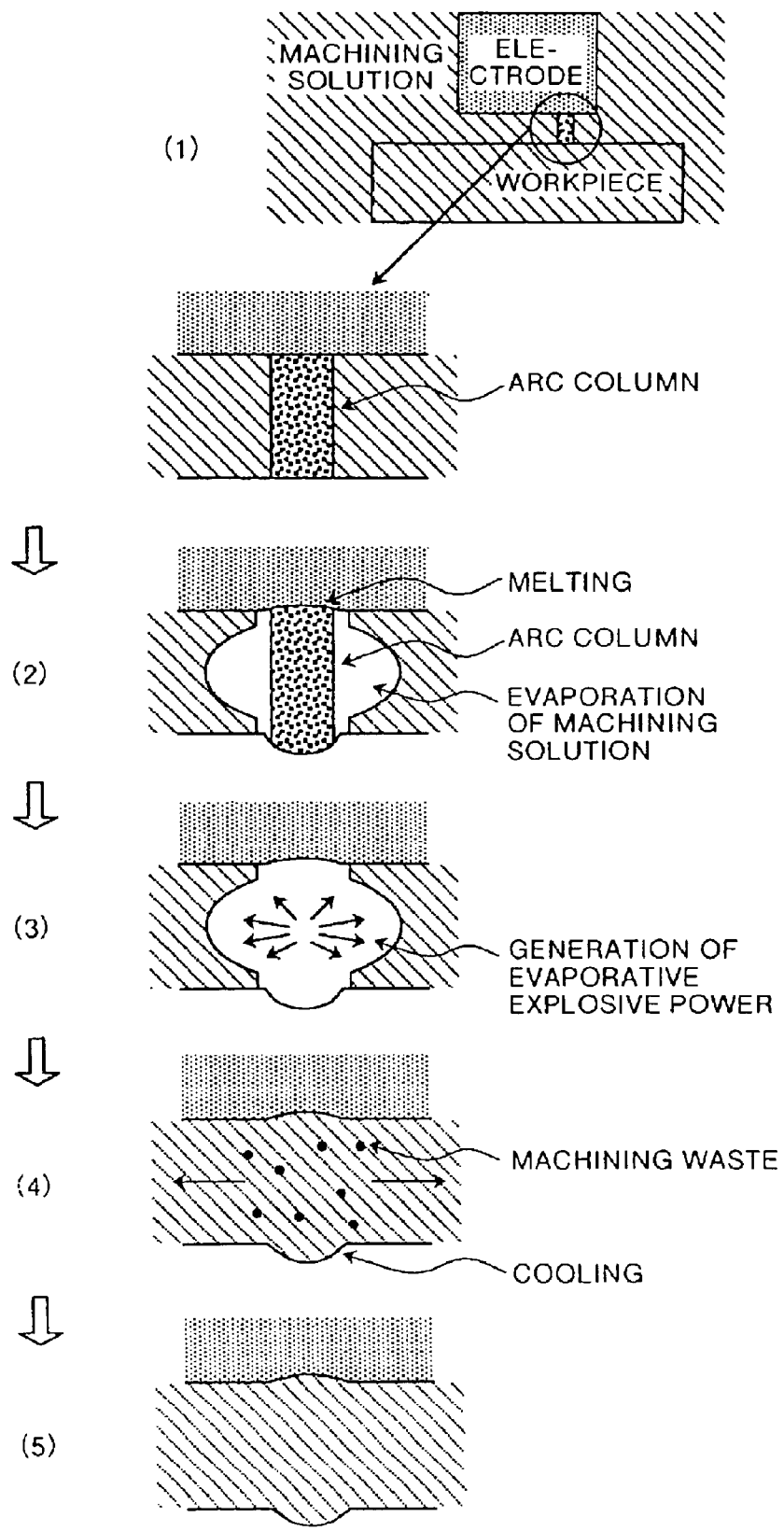

FIRST CUTTING (ROUGH MACHINING)

SECOND CUTTING (MIDDLE MACHINING)

THIRD CUTTING (FINISHING)

METHOD OF AND APPARATUS FOR WIRE ELECTRIC-DISCHARGE MACHINING

FIELD OF THE INVENTION

The present invention relates to a method of and apparatus for wire electric-discharge machining.

BACKGROUND OF THE INVENTION

FIG. 14 shows the mechanism of general electric-discharge machining which is popularly used in the field of mold machining in the automotive industry, the home electric industry, the semiconductor industry, and the like. When a pulse-like voltage is applied to an inter-pole gap between an electrode and a workpiece which are dipped in a machining liquid, the processes are sequentially performed, such as (1) formation of an arc column by generation of discharge and local melting by discharge heat energy, (2) to (3) generation of evaporative explosive power of the machining liquid and scattering of the melted portion, and (4) to (5) cooling and solidification of the melted portion by the machining liquid and recovery of inter-pole insulation. These processes are repeated at a high frequency, and thereby the workpiece can be machined. In electric-discharge machining, an inter-pole gap between the electrode and the workpiece is kept to be very small, i.e., several $\mu$m to several ten $\mu$m. This is an important factor of precise machining.

Of such discharge machining techniques, a target of this invention is a wire discharging machining technique which machines a workpiece by using a wire electrode. The wire electric-discharge machining technique is used in piercing machining, cutting machining, and the like, and a demand for precise machining is especially enhanced. For example, a precise mold used in the semiconductor industry, a high precision of 1 to 2 $\mu$m has been demanded.

FIGS. 15A, 15B, and 15C show machining processes performed in the wire electric-discharge machining. As shown in FIG. 15A, in the wire electric-discharge machining, rough machining called first cutting is performed first. This first cutting is machining in which a wire electrode is passed through an initial hole, and a workpiece is cut by the wire electrode. In general, in the first cutting, in order to perform finishing after the first cutting, severe surface roughness and severe precision are not demanded, but the most important factor is that a machining speed is increased. In order to increase the machining speed in the wire electric-discharge machining, a machining liquid is strongly sprayed so that machining waste is efficiently exhausted from the inter-pole gap between the wire electrode and the workpiece. In order to uniformly spray the machining liquid and to prevent disconnection of the wire electrode, a method of dipping the workpiece in the machining liquid collected in a machining tank is used.

Upon completion of the first cutting, a core (scrap) is removed, and, as shown in FIG. 15B, middle finishing called second cutting is performed. In addition, as shown in FIG. 15C, finishing called third cutting is performed. By the way, the second cutting and the third cutting are called for convenience in easy understanding, which means that all the machining procedures are not always completed in three processes. Some are completed by performing the second cutting, but some requires third or more processes when demands for surface roughness and dimensional precision are severe.

In finishing after the second cutting, surface roughness is made fine to adjust the shape. Therefore, when an amount of residue on a target shape is uneven, the shape is corrected, but when an amount of residue on a target shape becomes even, machining which uniformly removes the workpiece must be performed. When such finishing is performed, so-called "electrode position servo", which controls drive speeds serving as a speed of relative movement of the wire electrode and the workpiece, is performed such that the drive speeds are equal to a predetermined value based on an inter-pole voltage between the wire electrode and the object to be machined.

On the other hand, in the wire electric-discharge machining, an adaptive control to prevent disconnection of the wire electrode which causes machining interruption is performed. As an adaptive control to prevent disconnection, the most ordinary method is one that changes a discharge stop time to decrease machining energy.

As explained above, in the wire electric-discharge machining, a plurality of control methods are often applied to a mechanical system, a power supply system, and the like. However, the application of the plurality of control methods may unexpectedly produce an inconvenience in a machining result.

An example of such an inconvenience will be explained below with reference to a wire electric-discharge machining apparatus shown in FIG. 16. In FIG. 16, reference numeral 1001 denotes a wire electrode, 1002 a workpiece, 1003 a movable table, 1004 a machining power supply, 1005 a machining power supply control unit, 1006 a control unit, 1007 a servo mechanism, and 1008 denotes an inter-pole voltage detection unit.

The control unit 1006 sends a machining condition signal to the machining power supply control unit 1005 according to an input machining condition. The machining power supply control unit 1005 drives a switching element (not shown) of the machining power supply 1004 according to a signal from the control unit 1006. The machining power supply 1004 applies a pulse-like voltage across the wire electrode 1001 and the workpiece 1002 to perform electric-discharge machining to the workpiece 1002. An inter-pole voltage between the wire electrode 1001 and the workpiece 1002 in the electric-discharge machining is detected by the inter-pole voltage detection unit 1008 to be sent to the control unit 1006. The control unit 1006 determines a drive speed of the movable table 1003 based on inter-pole voltage information sent from the inter-pole voltage detection unit 1008 and sends a command to the servo mechanism 1007. As a result, the servo mechanism 1007 allows the movable table 1003 to move at the drive speed, and the wire electrode 1001 and the workpiece 1002 relatively move.

In general, a positional control of the wire electrode 1001 is performed based on a measured voltage in the inter-pole voltage detection unit 1008. As a control method used in this case, the following method is used. That is, drive speeds serving as a speed of relative movement between the wire electrode 1001 and the workpiece 1002 are increased when the inter-pole voltage is high, and the drive speeds are decreased when the inter-pole voltage is low. However, it has been understood that the control method for the drive speeds cannot be used without various problems.

In the first cutting, it is mainly required that a machining speed is increased as explained above. Disconnection which is a factor of hindering the increase in machining speed must be avoided as much as possible. Research and development are earnestly performed to prevent disconnection. Although various methods are reported and practically used, a method which is the most effective method is that a discharge stop time is elongated.

However, since a power supply control which elongates the discharge stop time responses considerably quickly as compared to a drive control for the mechanical system, a vibration phenomenon may occur due to the difference between respective responses of both the controls.

The wire electric-discharge machining apparatus which performs a control to prevent the wire electrode 1001 from being disconnected recognizes a decrease in inter-pole voltage as a leading phenomenon in which the wire electrode 1001 is disconnected. Therefore, when the inter-pole voltage lowers, the operation of elongating a discharge stop time is performed. This operation is effective as means for preventing disconnection. When the discharge stop time becomes long, the inter-pole voltage more lowers and thereby the apparatus erroneously recognizes that the wire electrode 1001 is about to be disconnected, and performs the operation of further elongating the discharge stop time. Such a series of operations produces a vicious circle. In contrast to this, when the inter-pole gap increases to raise the inter-pole voltage, the machining power supply control unit 1005 performs a control which shortens the discharge stop time. When the discharge stop time becomes short, the inter-pole voltage becomes high. Therefore, the apparatus erroneously recognizes that the inter-pole gap becomes further large and performs an operation of further shortening the discharge stop time.

On the other hand, in finishing performed after the second cutting, machining energy is not so increased, and therefore the phenomenon in which the wire electrode 1001 is disconnected does not occur unless any trouble occurs. Accordingly, such a problem may not occur frequently. In the finishing performed after the second cutting, since it is required that the workpiece 1002 is uniformly removed, an inconvenience may occur with the requirement.

For example, it may be desired that a machining removal amount of the workpiece is decreased through wire electric-discharge machining to keep the precision of shapes such as an outside corner or the like of a sharp edge. At the outside corner, the wire electrode 1001 is stayed for a long period of time in a range which is very close to the outside corner. For this reason, the machining removal amount of the workpiece is often excessive with respect to a desired shape. In such a case, it is general that the discharge stop time is elongated to decrease the machining removal amount.

However, when the discharge stop time is elongated in order to decrease the machining removal amount, the inter-pole voltage decreases, and the drive speed becomes low. Accordingly, the machining removal amount does not decrease as it is desired. Similar examples include a contact between a portion of a shape to be machined and a portion called an approach which leads to the shape.

As explained above, when the control for the mechanical system and the control for the power supply system are simultaneously performed, the controls become easily unstable, and a machining removal amount may not precisely be controlled.

SUMMARY OF THE INVENTION

It is an object of this invention to obtain a method of and apparatus for wire electric-discharge machining which can precisely controlling a machining removal amount in finishing machining and improving machining precision.

The wire electric-discharge machining apparatus according to one aspect of this invention comprises a control unit which determines a speed of relative movement between a wire electrode and a workpiece based on a voltage corresponding to an inter-pole voltage between the wire electrode and the workpiece. The wire electric-discharge machining apparatus further comprises a machining unit which generates a discharge between the wire electrode and the workpiece and relatively moves the wire electrode and the workpiece at the speed of relative movement determined by the control unit to process the workpiece. The wire electric-discharge machining apparatus also comprises an inter-pole voltage correction unit which corrects the voltage corresponding to the inter-pole voltage according to a correction coefficient which increases depending on an increase in discharge stop time. The corrected voltage corresponding to the inter-pole voltage output from the inter-pole voltage correction unit is given to the control unit to relatively move the wire electrode and the workpiece according to the corrected voltage corresponding to the inter-pole voltage.

According to the above-mentioned aspect, when a discharge stop time becomes long, correction is performed by the inter-pole voltage correction unit such that a voltage corresponding to an inter-pole voltage increases, and the wire electrode and the workpiece relatively move depending on the corrected voltage corresponding to the inter-pole voltage.

The wire electric-discharge machining method according to another aspect of this invention comprises the steps of generating discharge between a wire electrode and a workpiece, determining a speed of relative movement based on a voltage corresponding to an inter-pole voltage between the wire electrode and the workpiece, and relatively moving the wire electrode and the workpiece at the speed of relative movement to process the workpiece. The wire electric-discharge machining method further comprises the steps of elongating a discharge stop time when a machining removal amount is partially reduced, and of correcting the voltage corresponding to the inter-pole voltage depending on the elongated discharge stop time.

According to the above-mentioned aspect, the machining removal amount per unit time can be decreased by elongating the discharge stop time without decreasing the speed of relative movement between the wire electrode and the object to be machined.

The wire electric-discharge machining method according to the still another aspect of this invention comprises the steps of generating discharge between a wire electrode and a workpiece, determining a speed of relative movement based on a voltage corresponding to an inter-pole voltage between the wire electrode and the workpiece, and relatively moving the wire electrode and the workpiece at the speed of relative movement to process the workpiece. The wire electric-discharge machining further comprises the steps of elongating a discharge stop time at a crossing portion between a contour forming path of the wire electrode in the workpiece and an approach path reaching the contour forming path in comparison with another portion, and correcting the voltage corresponding to the inter-pole voltage depending on the elongated discharge stop time.

According to the above-mentioned aspect, the machining removal amount per unit time can be decreased by elongating the discharge stop time without decreasing the speed of relative movement between the wire electrode and the workpiece, at the crossing portion between the contour forming path of the wire electrode in the workpiece and the approach path reaching the contour forming path.

The wire electric-discharge machining method according to still another aspect of this invention comprises the steps of generating discharge between a wire electrode and a workpiece, determining a speed of relative movement based on a voltage corresponding to an inter-pole voltage between the wire electrode and the workpiece, and relatively moving the wire electrode and the workpiece at the speed of relative movement to process the workpiece. The wire electric-discharge machining further comprises the steps of elongating a discharge stop time at a corner portion of the workpiece in comparison with another portion, and correcting the voltage corresponding to the inter-pole voltage depending on the elongated discharge stop time.

According to the above-mentioned aspect, the machining removal amount per unit time can be decreased by elongating the discharge stop time without decreasing the speed of relative movement between the wire electrode and the workpiece, at the corner portion of the workpiece.

Other objects and features of this invention will become apparent from the following description with reference to the accompanying drawings.

BRIEF DESCRIPTION OF THE DRAWINGS

FIGS. 2A, 2B, and 2C are waveforms of the inter-pole voltage when electric-discharge machining is performed, in which FIG. 2A is a graph of the normal discharge state, FIG. 2B is a graph obtained when the inter-pole gap is slightly wide open, and FIG. 2C is a graph obtained when the inter-pole gap is slightly short-circuited, FIGS. 4A and 4B show a moving path of the wire electrode with respect to the workpiece, in which FIG. 4A is a concept diagram which shows an outside corner portion of a sharp edge, and FIG. 4B is a concept diagram which shows a contour forming portion, FIGS. 5A and 5B show a waveform of the inter-pole voltage obtained when electric-discharge machining is performed, in which FIG. 5A is a graph of the normal discharge state, and FIG. 5B is a graph obtained when the discharge stop time is elongated, FIGS. 6A and 6B show contents of correction by the inter-pole voltage correction unit, in which FIG. 6A is a graph which shows the waveform of the inter-pole voltage and the corrected average voltage in the normal discharge state, and FIG. 6B is a graph which shows the waveform of the inter-pole voltage and the corrected average voltage when the discharge stop time is elongated, FIGS. 7A and 7B show a state in which the capacitance of a cable for machining energy supply and a machining power supply affect to the waveform of an inter-pole voltage, in which FIG. 7A is a graph of the normal discharge state, and FIG. 7B is a graph obtained when the discharge stop time is elongated, FIG. 14 is a concept diagram which sequentially shows the principle of general electric-discharge machining along (1) to (5)

DETAILED DESCRIPTION

Embodiments of the method of and the apparatus for wire electric-discharge machining according to the present invention will be explained in detail with reference to the accompanying drawings.

Figure 1:
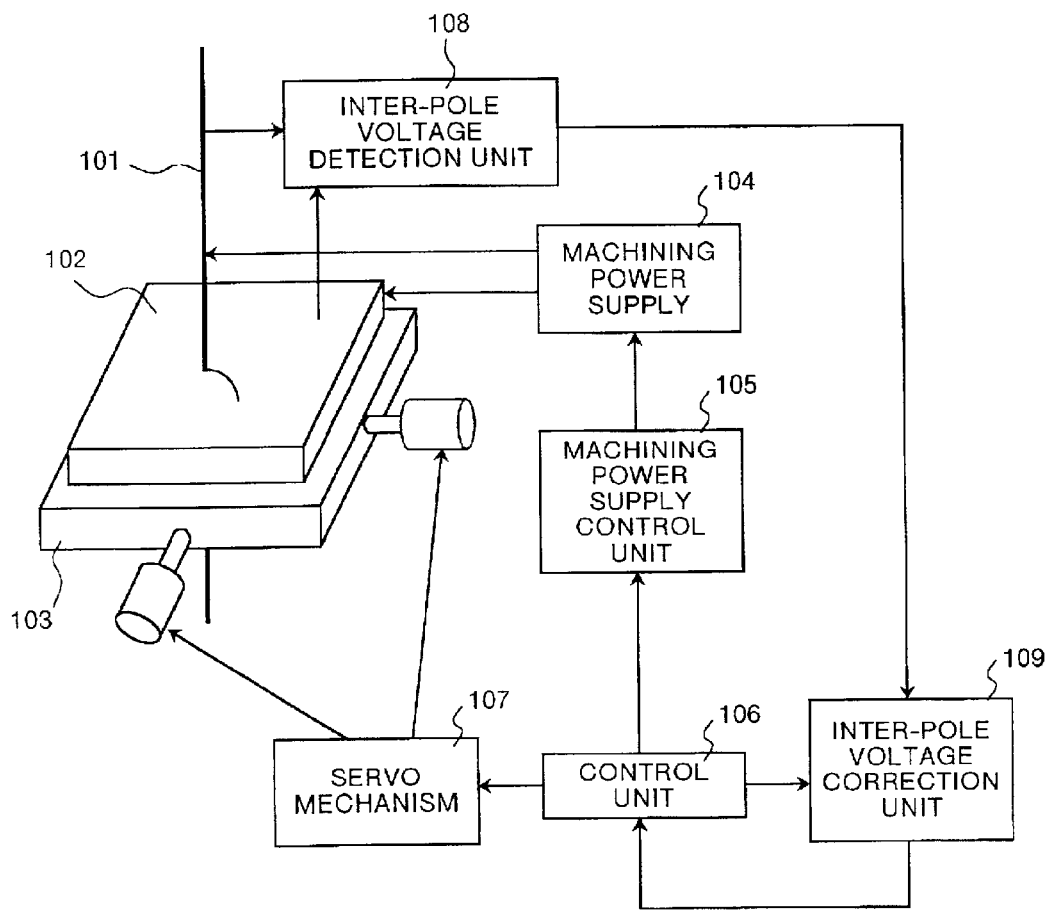
FIG. 1 is a schematic diagram which shows the configuration of the wire electric-discharge machining apparatus according to the first embodiment of this invention.
Figure 16:
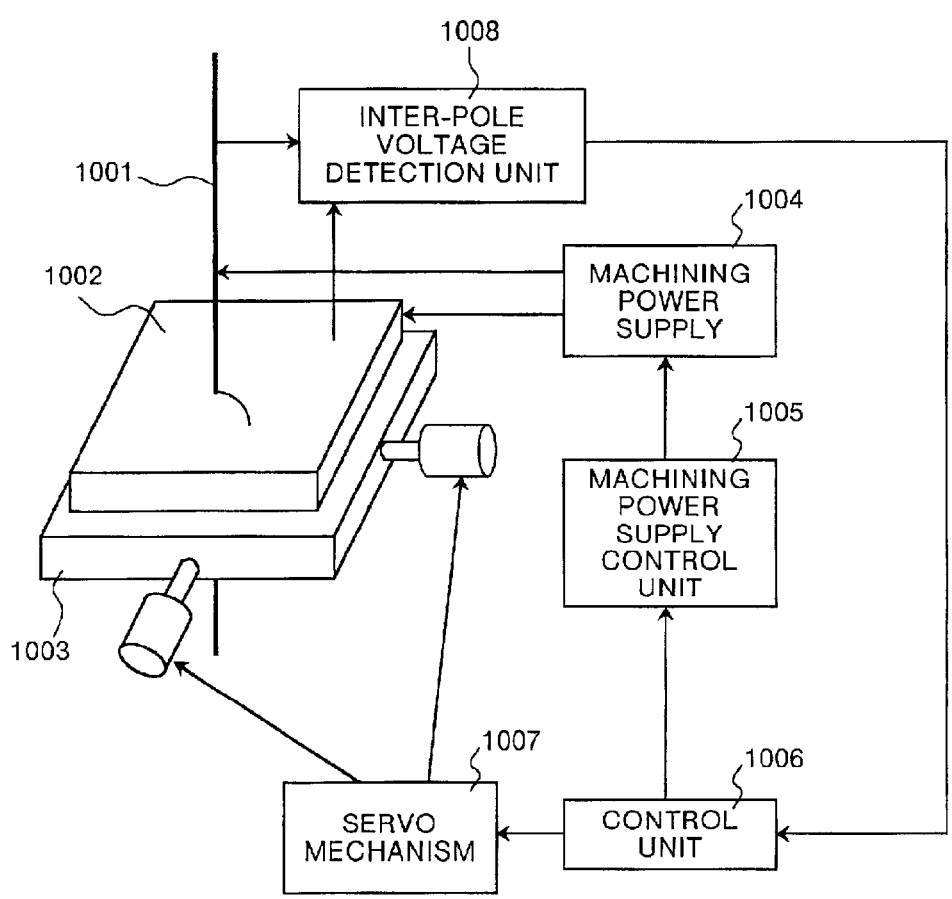
FIG. 16 is a schematic diagram which shows the configuration of the conventional wire electric-discharge machining apparatus.

FIG. 1 shows a wire electric-discharge machining apparatus according to a first embodiment. The wire electric-discharge machining apparatus shown here, like the conventional wire electric-discharge machining apparatus shown in FIG. 16, comprises a movable table 103 on which a workpiece 102 is placed, a machining power supply 104 which applies a pulse-like voltage across a wire electrode 101 and the workpiece 102 to generate discharge between the wire electrode 101 and the workpiece 102, a machining power supply control unit 105 which controls an operation of the machining power supply 104, a control unit 106 which controls the machining power supply 104 and a servo mechanism 107 explained later, the servo mechanism 107 which drives the movable table 103 according to a command of the control unit 106, and an inter-pole voltage detection unit 108 which detects an inter-pole voltage between the wire electrode 101 and the workpiece 102 as main components. In addition to the main components, an inter-pole voltage correction unit 109 is further included in the wire electric-discharge machining apparatus. The inter-pole voltage correction unit 109 receives a signal of the inter-pole voltage detection unit 108 and a signal of the control unit 106, corrects a signal of the inter-pole voltage according to these signals, and returns the corrected signal to the control unit 106.

In this wire electric-discharge machining apparatus, when the control unit 106 sends a machining condition signal to the machining power supply control unit 105 according to an input machining condition, the machining power supply control unit 105 drives a switching element (not shown) of the machining power supply 104 according to the signal from the control unit 106. In this manner, a pulse-like voltage is applied across the wire electrode 101 and the workpiece 102, so that electric-discharge machining is performed to the workpiece 102.

The inter-pole voltage in electric-discharge machining is detected by the inter-pole voltage detection unit 108, and the detection result is sent to the inter-pole voltage correction unit 109. The inter-pole voltage correction unit 109 corrects the inter-pole voltage detected by the inter-pole voltage detection unit 108 based on the detection result of the inter-pole voltage detection unit 108 and a set signal of a discharge stop time output from the control unit 106, and returns the correction result to the control unit 106. The control unit 106 determines a drive speed by the corrected inter-pole voltage signal received from the inter-pole voltage correction unit 109, and sends the signal to the servo mechanism 107. As a result, the servo mechanism 107 moves the movable table 103 at the drive speed, and the wire electrode 101 and the workpiece 102 relatively move to perform electric-discharge machining.

FIGS. 2 to 6 are diagrams which explain correction to the inter-pole voltage performed by the inter-pole voltage correction unit 109. The characteristic portions of this invention will be explained below with reference to these drawings. The contents explained in FIGS. 2 to 6 are obtained by a power supply in which the pulse width of a voltage and a discharge stop time are constant. However, the result is substantially the same as explained above when a power supply in which a discharge time is constant is used.

Figure 2A:
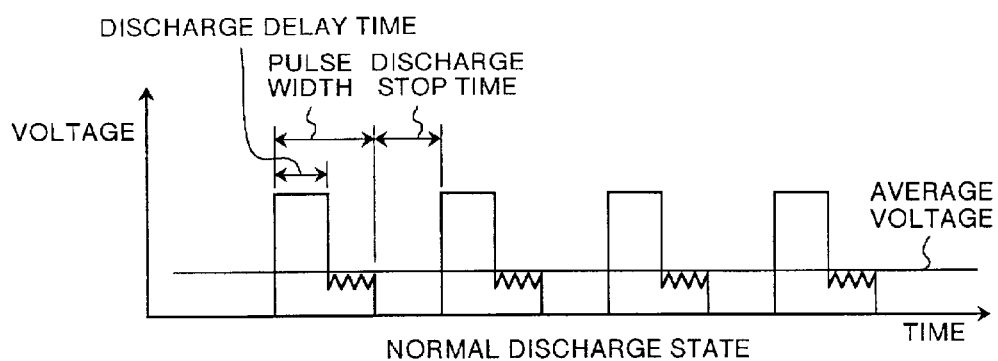
Figure 2B:
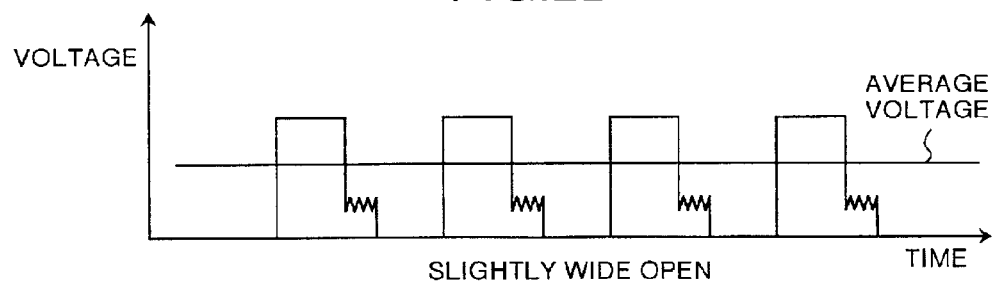
Figure 2C:
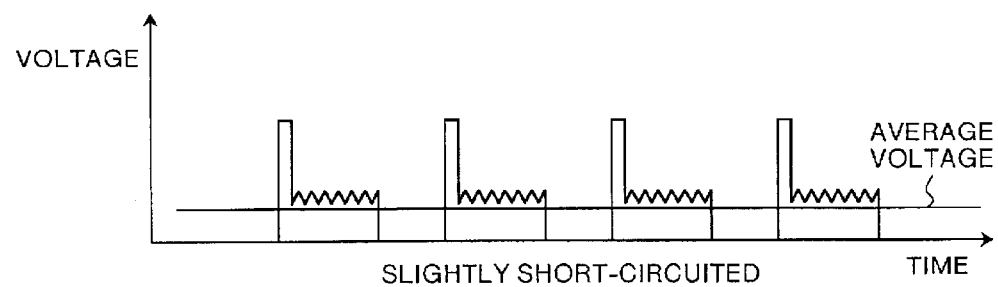

A method of determining a conventional drive speed will be explained below with reference to FIGS. 2A, 2B, 2C to FIGS. 5A and 5B. FIGS. 2A, 2B, and 2C show the waveforms of an inter-pole voltage obtained when electric-discharge machining is performed. In general wire electric-discharge machining, a drive speed which is a speed of relative movement between the wire electrode 101 and the workpiece 102 is determined according to an inter-pole average voltage. For example, the state in FIG. 2A is defined as a normal discharge state. It is assumed that the wire electrode 101 and the workpiece 102 move at predetermined drive speeds. In contrast to this, a machining removal amount of the workpiece 102 decreases due to some factor that the distance between the wire electrode 101 and the workpiece 102 increases. When the inter-pole gap is slightly wide open, the waveform shown in FIG. 2B is obtained. This waveform is obtained when a power supply which has a voltage waveform having a constant pulse width. Therefore, the waveform indicates that a discharge delay time, which is a time since a voltage is applied to the inter-pole until discharge is generated, is long. At this time, the inter-pole average voltage increases. In contrast-to this, when the inter-pole gap is slightly short-circuited, the waveform shown in FIG. 2C is obtained. This waveform indicates that a discharge delay time is short due to the short inter-pole distance. At this time, the inter-pole average voltage decreases.

In other word, FIGS. 2A, 2B, and 2C explained above show that a small amount of machining removal may be allowable when the inter-pole gap is slightly wide open. In contrast to this, a large amount of machining removal must be removed when the inter-pole gap is slightly short-circuited. Therefore, when the inter-pole average voltage increases and this increase generally indicates that the inter-pole gap is slightly wide open, control is provided so that the drive speed as the speed of relative movement between the wire electrode 101 and the workpiece 102 is increased. Conversely, when the average inter-pole voltage decreases and this decrease indicates that the inter-pole gap is slightly short-circuited, control is provided so that the drive speed as the speed of relative movement between the wire electrode 101 and the workpiece 102 is decreased.

Figure 3:
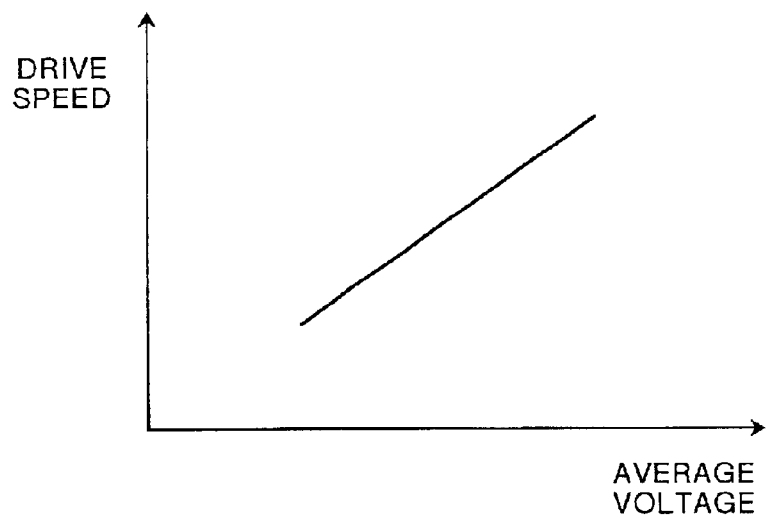
FIG. 3 is a graph which shows a relationship between the average inter-pole voltage and the speed of relative movement.

The relationship between the inter-pole average voltage and the speed of relative movement is shown in FIG. 3. In FIG. 3, the abscissa indicates an inter-pole average voltage, and the ordinate indicates the drive speed. Detailed determining methods are various. However, in general, a control is performed such that the drive speed is increased when the inter-pole average voltage increases and such that the drive speed is decreased when the inter-pole average voltage decreases.

Figure 4A:
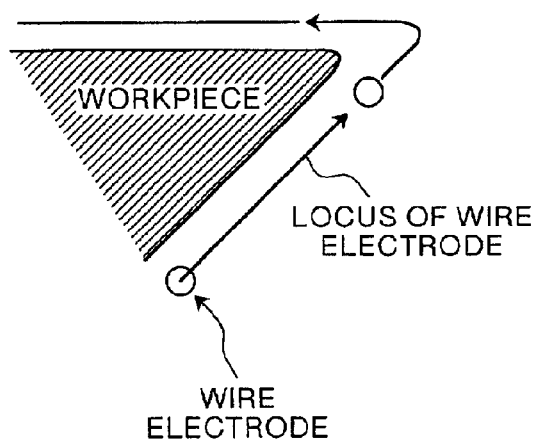
Figure 4B:
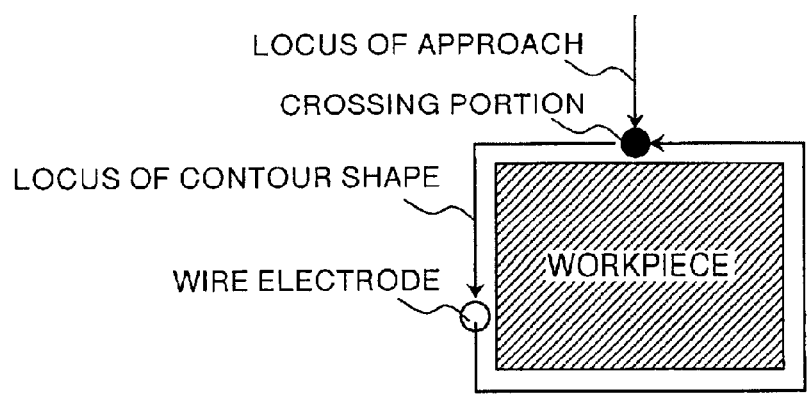

In finishing of the wire electric-discharge machining, it may be desired that an amount of machining removal be partially reduced. FIGS. 4A, 4B show such examples, i.e., an outside corner portion of a sharp edge (FIG. 4A) and a crossing portion between a path of contour forming and a path of an approach (FIG. 4B). More specifically, the wire electrode 101 is stayed for a period of time longer, as compared to that of another portion, at the outside corner portion of the sharp edge and the crossing portion between the contour forming path and the approach path. The machining removal amount of the workpiece 102 becomes easily excessive. More specifically, sags occur at the corner portion in the case of FIG. 4A and a linear recessed portion is formed at the crossing portion between the contour forming path and the approach path in the case of FIG. 4B. In order to avoid these phenomena, it is effective to decrease machining energy only at the portions and decrease the machining removal amount.

As a method of decreasing the machining energy, it is considered effective that the discharge stop time is elongated. When the discharge stop time is elongated, the machining removal amount per unit time of the workpiece 102 can be decreased.

However, an actual amount of machining removal from the workpiece 102 is determined based on a machining removal amount per unit time and a drive speed. Therefore, when the drive speed becomes low, the machining removal amount is not desirably decreased even though the machining removal amount per unit time is decreased.

This point will be explained below with reference to FIGS. 5A and 5B. FIG. 5A shows the waveform of an inter-pole voltage when normal electric-discharge machining is performed. At this time, a drive speed which is a speed of relative movement between the wire electrode 101 and the workpiece 102 is determined by an average voltage as shown in FIG. 3.

When a discharge stop time is elongated based on this state in order to decrease the machining removal amount, an inter-pole voltage has the waveform shown in FIG. 5B. The machining removal amount per unit time is surely decreased by elongating the discharge stop time. However, since the inter-pole average voltage is also decreased by elongating the discharge stop time, the drive speed determined by the relationship shown in FIG. 3 decreases. When the drive speed decreases, a time in which the wire electrode 101 faces the workpiece 102 is elongated. Therefore, the amount of machining removal from the workpiece 102 conversely increases.

Consequently, the amount of machining removal from the workpiece 102 is obtained by adding an increase obtained due to a decrease in the drive speed with respect to a decrease due to elongation of the discharge stop time. Therefore, the decrease is not always obtained as desired.

In this invention, the inter-pole voltage is corrected in the inter-pole voltage correction unit 109 to avoid the above phenomena. The cause of the above phenomena is that the inter-pole voltage detection unit 108 detects the average voltage including the discharge stop time. Therefore, as the average voltage which is a factor of determining the drive speed, it is effective that the increase of the discharge stop time is neglected.

Figure 6A:
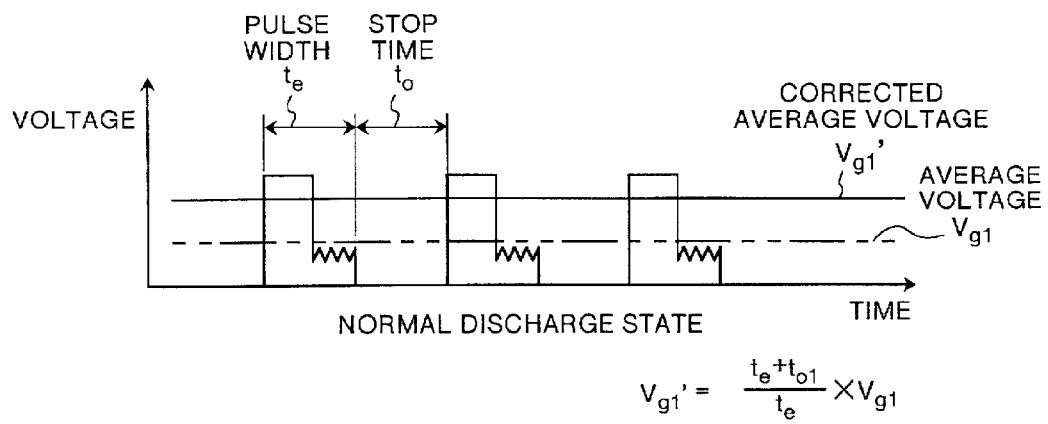

More specifically, as shown in FIG. 6A, correction is performed so that the discharge stop time is canceled from calculation of the average voltage. In other words, a pulse width is represented by te, a discharge stop time is represented by to1, and an average voltage actually detected by the inter-pole voltage detection unit 108 is represented by Vg1. In this case, theoretically, the discharge stop time is a time in which no voltage is applied, and therefore a corrected average voltage Vg1' is given by the following equation (1).

$$Vg1'=\{(te+to1)/te\} \times Vg1 \quad (1)$$

Figure 6B:
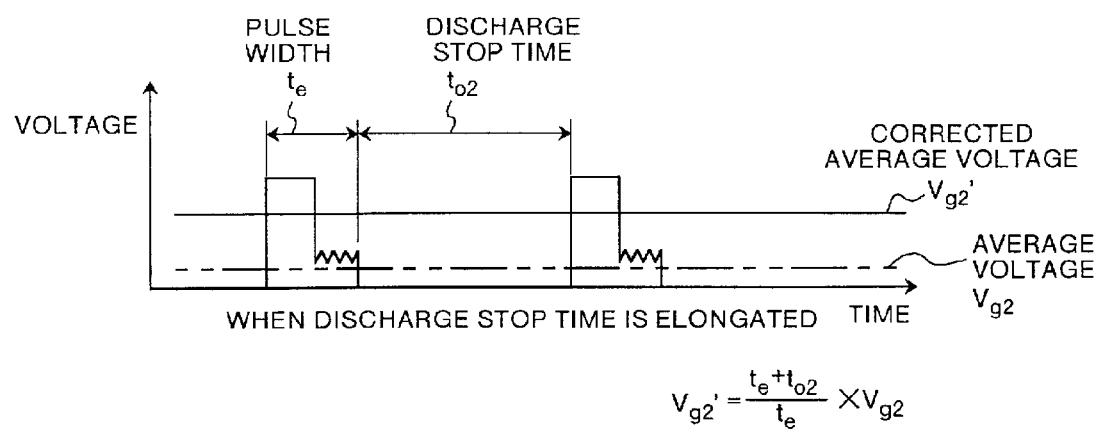

Similarly, as shown in FIG. 6B, when the discharge stop time is elongated to to2 from the state shown in FIG. 6A, the pulse width is represented by te, and an average voltage actually detected by the inter-pole voltage detection unit 108 is represented by Vg2. In this case, a corrected average voltage Vg2' is given by the following equation (2).

$$Vg2'=\{(te+to2)/te\} \times Vg2 \quad (2)$$

The corrected average voltages Vg1' and Vg2' calculated using these equations (1) and (2) are average voltages indicating voltage application times in which the discharge stop times are neglected, and are not affected by the lengths of the discharge stop times.

According to the wire electric-discharge machining apparatus of the first embodiment in which the drive speed is determined based on an average time corrected by the inter-pole voltage correction unit 109, even though the discharge stop time is changed, the drive speed which is the speed of relative movement between the wire electrode 101 and the workpiece 102 is not affected by the length of the discharge stop time. Therefore, at the outside corner portion of the sharp edge shown in FIG. 4A or at the crossing portion between the contour forming path and the approach path shown in FIG. 4B, it is possible to decrease the respective machining removal amounts according to the elongations of the discharge stop times by elongating the discharge stop times. As a result, a case in which sags occur at the outside corner portion and a case in which a linear recessed portion is formed at the crossing portion between the contour forming path and the approach path can be effectively prevented, and the machining precision of finishing can be remarkably improved.

Figure 7A:
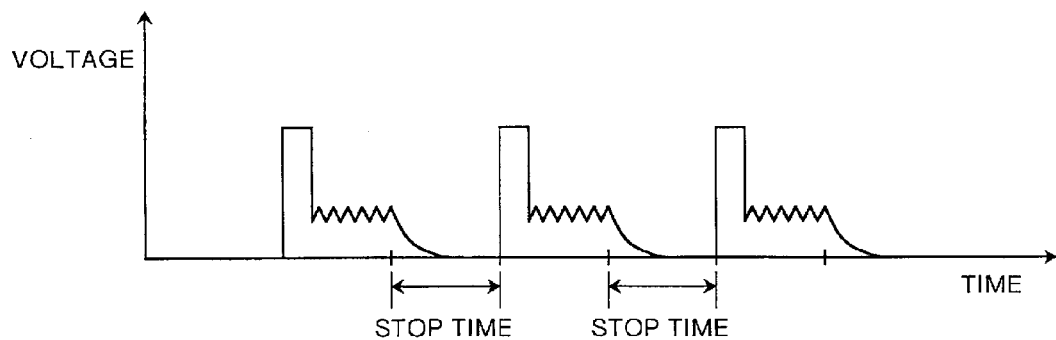
Figure 7B:
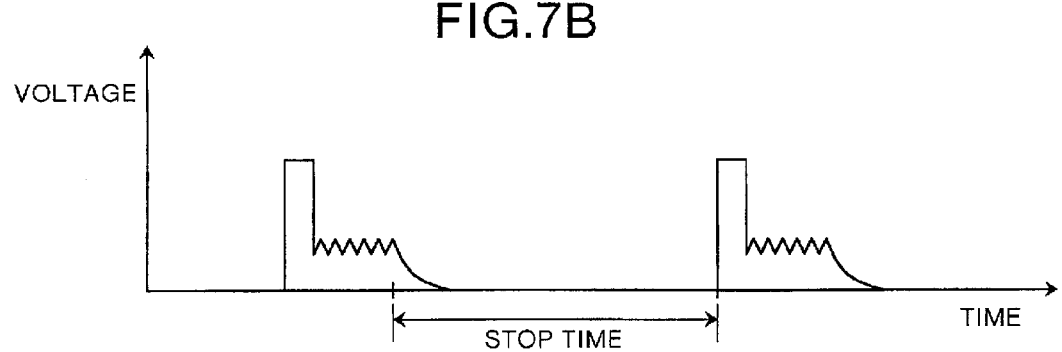

A second embodiment of this invention will be explained below. As explained in the first embodiment, when the inter-pole voltage is theoretically corrected, the sufficient effects can be expected. However, a cable for machining energy supply and the machining power supply 104 exist between the wire electrode 101 and the workpiece 102, and capacitance exists in the cable and the machining power supply 104. Therefore, when the waveform of the inter-pole voltage is actually observed, as shown in FIG. 7A and FIG. 7B, a voltage is in many cases generated even during the discharge stop time. Therefore, in a case in which higher machining precision is required, it is effective that the inter-pole voltage is corrected to an average voltage measured in a gauging manner.

Figures 8, 9:
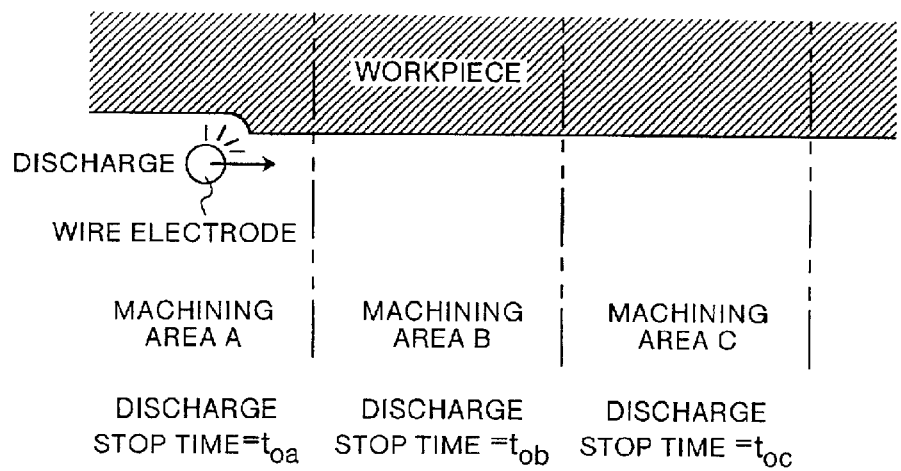
FIG. 8 is a diagram which shows the correspondence table between discharge stop times and correction coefficients which are applied to the wire electric-discharge machining apparatus according to the second embodiment of this invention.
FIG. 9 is a concept diagram which shows a forming procedure of the correspondence table shown in FIG. 8.

FIG. 8 is a table which shows correspondence of a detected voltage, a correction coefficient, a corrected voltage and a drive speed with respect to a discharge stop time obtained when a predetermined machining condition is selected. This table is stored in, for example, the inter-pole voltage correction unit 109 in advance.

As shown in FIG. 9, the correction coefficient of the table is calculated which the workpiece 102 is actually machined. It is assumed that each surface of the workpiece 102 is subjected to finishing according to the purpose of the machining.

More specifically, a correction coefficient Ka is calculated in advance with reference to a predetermined condition, e.g., the condition of a discharge stop time $T_{oa}$. The correction coefficient Ka is used as a reference. As a method of calculating the correction coefficient Ka, the method explained in the first embodiment may be used.

Machining is actually performed while the discharge stop time is changed into $T_{ob}$, $T_{oc}$, . . . in every machining area of the workpiece 102, and correction coefficients Kb, Kc, . . . corresponding to the discharge stop times are calculated. As a method of calculating the correction coefficients Kb, Kc, . . . , the following method is used.

That is, when machining is performed as shown in FIG. 9, a drive speed va is previously measured in a machining area A. When machining is performed in machining areas B, C, . . . , the correction coefficients Kb, Kc, . . . are successively adjusted and obtained so that each of drive speeds in the machining areas B, C, . . . is equal to the drive speed va in the machining area A.

In this manner, the correction coefficients are calculated when the discharge stop time is changed depending on actual pulse widths, and the correction coefficients are stored in a table. In this case, a machining removal amount can be more precisely controlled according to the length of the discharge stop time. High machining precision can be expected in finishing.

Figure 11:
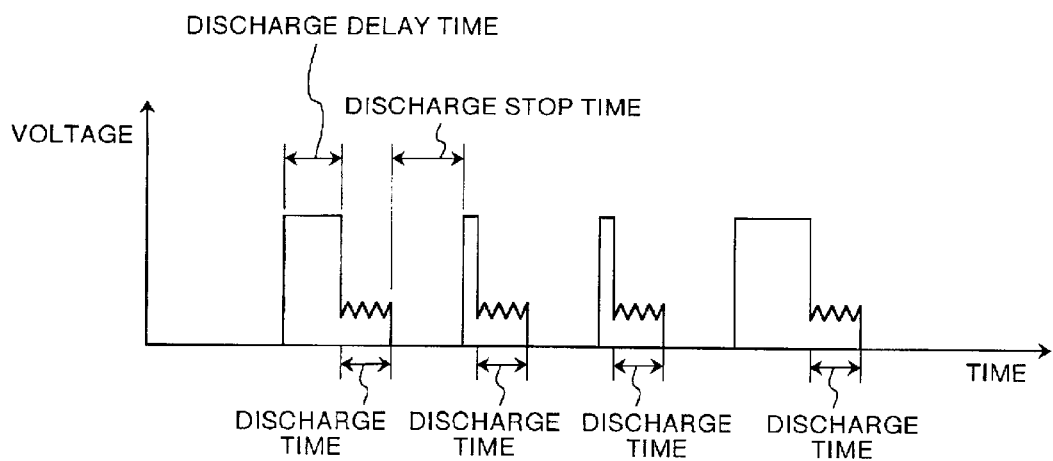
FIG. 11 is a graph which shows the waveform of the machining power supply applied to the wire electric-discharge machining apparatus shown in FIG. 10.

A third embodiment of this invention will be explained below. Each of the first embodiment and second embodiment shows the wire electric-discharge machining apparatus to which the power supply having a constant pulse width is applied. However, as a power supply for electric-discharge machining, the power supply in which a discharge time is constant is also known as shown in FIG. 11. In such a power supply, a discharge delay time is not known unless actual discharge is generated. Therefore, it is difficult to correct an average voltage based on a preset pulse width and a preset discharge stop time. A third embodiment is provided to solve the above problem and to actually measure a discharge stop time and calculate a correction voltage based on the measured discharge stop time.

Figure 10:
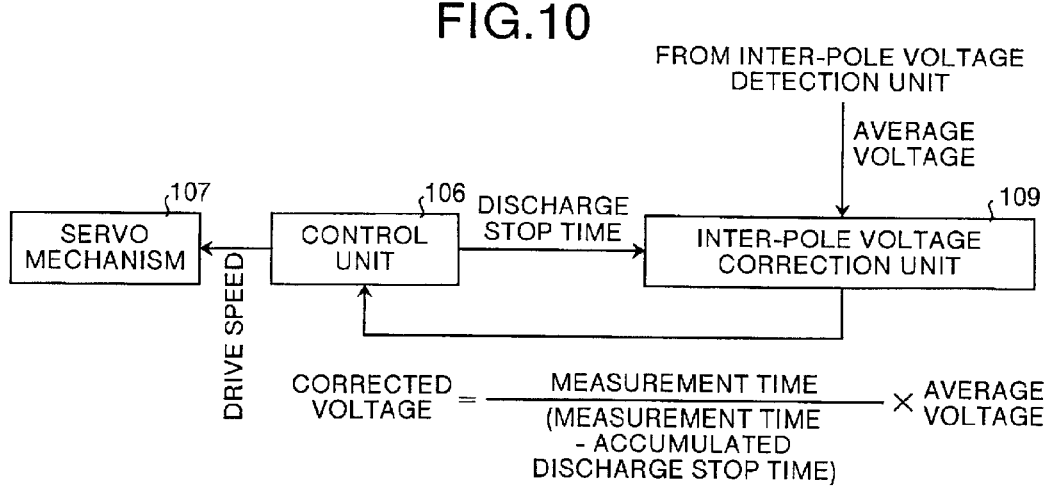
FIG. 10 is a block diagram which shows the main part of the wire electric-discharge machining apparatus according to the third embodiment of this invention.

FIG. 10 is a block diagram which explains a wire electric-discharge machining apparatus according to the third embodiment of the present invention. In FIG. 10, only portions related to the inter-pole voltage correction unit 109 are described. However, the other configurations of the wire electric-discharge machining apparatus are the same as those in FIG. 1.

The control unit 106 determines a cycle or the like of a voltage applied to the inter-pole gap. Therefore, by using information held by the control unit 106, an inter-pole voltage without a discharge stop time can be calculated. More specifically, when an equation given by corrected inter-pole voltage={measurement time/(measurement time−accumulated discharge stop time)}×measured inter-pole voltage is satisfied, an inter-pole average voltage when it is assumed that the discharge stop time is zero can be calculated. When the movable table 103 is driven based on the corrected inter-pole voltage, only the machining removal amount of the workpiece 102 can be changed according to the discharge stop time without changing a speed of relative movement between the wire electrode 101 and the workpiece 102. The measurement time includes, for example, a control cycle of the control unit 106, and therefore the time is preferably set to several ms to several ten ms.

Figure 12:
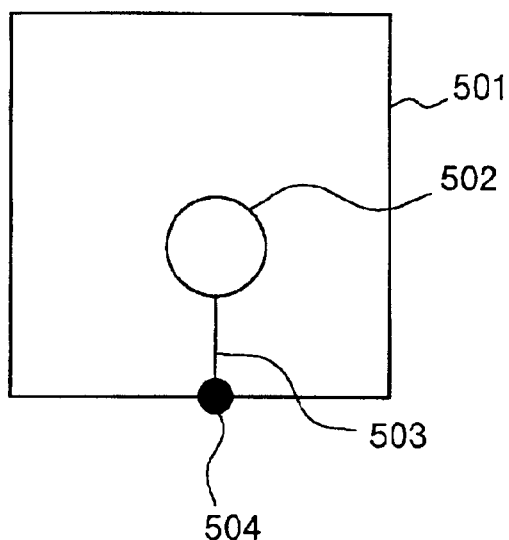
FIG. 12 is a concept diagram which shows the moving path of the wire electrode with respect to the contour forming portion of the workpiece.
Figure 13:
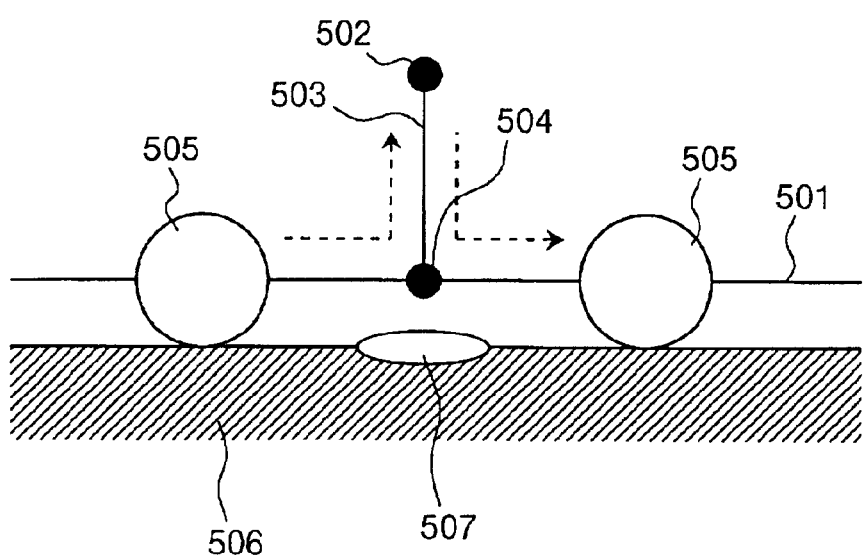
FIG. 13 is an enlarged concept diagram which shows the main part of the moving path of the wire electrode shown in FIG. 12.
Figure 15A:
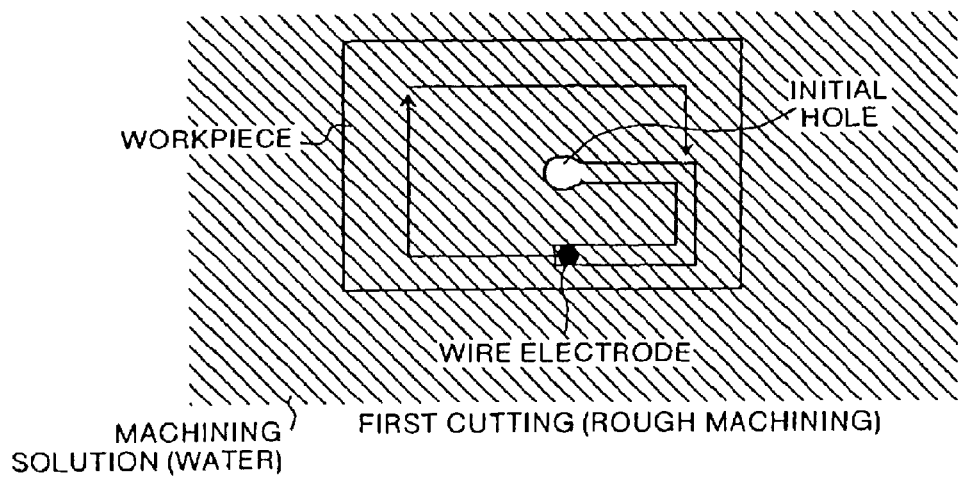
FIGS. 15A, 15B, and 15C are concept diagrams, in which FIGS. 15A to 15C sequentially show machining processes performed in wire electric-discharge machining.
Figure 15B:
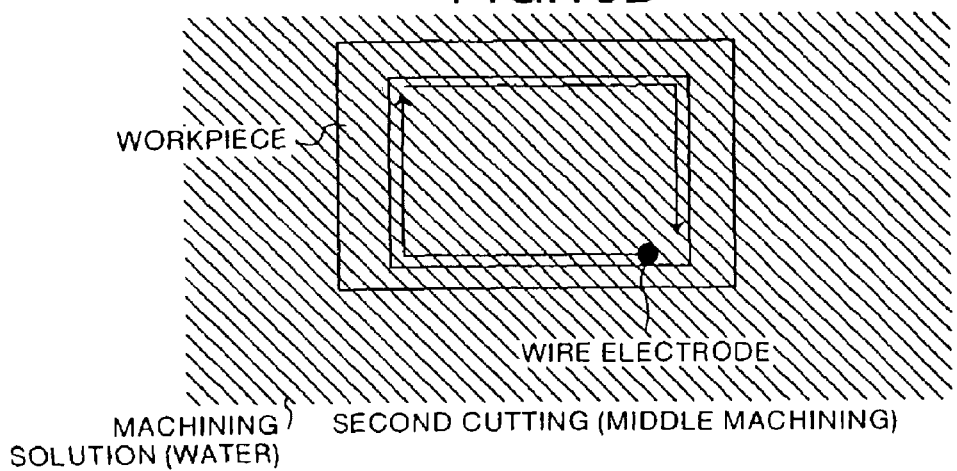
Figure 15C:
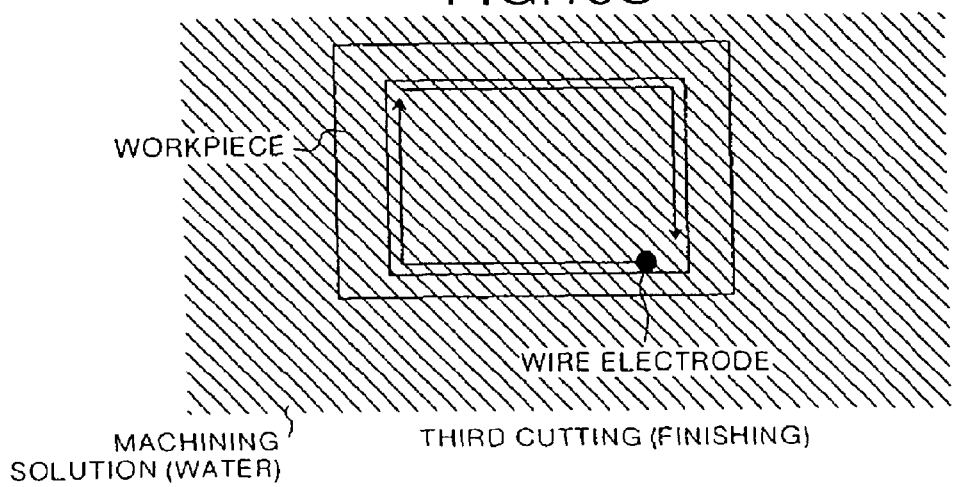

A fourth embodiment of this invention will be explained below. A problem of a small recessed portion (so-called "dimple") formed at a crossing portion between a contour forming path of a wire electrode in wire electric-discharge machining and an approach path reaching the contour forming path will be explained below. FIG. 12 is a diagram which shows the path of the wire electrode when wire electric-discharge machining is performed. In FIG. 12, reference numeral 501 denotes a contour forming path, 502 a machining start point, 503 an approach path, and 504 a crossing point between the contour forming path 501 and the approach path 503. FIG. 13 is an enlarged diagram of a portion near the crossing point 504 shown in FIG. 12. In FIG. 13, reference numeral 505 denotes a wire electrode, 506 a workpiece, and 507 a small recessed portion.

As well known, wire electric-discharge machining is a machining method in which the workpiece 506 is cut by using the wire electrode 505 as a jigsaw. As shown in FIG. 12, machining is performed not only the contour forming portion which is a target portion of the workpiece 506 but also the approach path 503 extending from a machining start point (referred to as the machining start point 502 hereinafter) such as a machining start hole to the path 501 of the contour forming portion. In the following explanation, the connection point between the contour forming path 501 and the approach path 503 is called the crossing point 504.

In the contour forming path 501 in normal wire electric-discharge machining, a path spaced apart from a shape to be machined by a predetermined distance (referred to as an offset hereinafter) is set in consideration of the radius, an inter-pole length, cost of finishing, and the like of the wire electrode 505. Machining is then performed while the center of the wire electrode 505 is moved along the offset contour forming path 501. More specifically, as shown in FIG. 13, the wire electrode 505 moves from the machining start point 502 to the contour forming path 501 offset from the crossing point 504 through the approach path 503. After the wire electrode 505 goes around the contour forming path 501 once, the wire electrode 505 returns from the crossing point 504 to the machining start point 502 through the approach path 503. If finishing is required, the moving is repeated according to machining paths in which offsets in the contour forming path 501 are sequentially set for each machining electrical conditions to be used.

When the wire electrode 505 is moved in the above-mentioned manner to go around the contour forming path 501 once, the wire electrode 505 passes through the crossing point 504 twice while passing through the other part of the contour forming path 501 only once. The workpiece 506, which is supposed to be machined in the second passing, has been removed in the first passing. Therefore, the machined surface undergoes another discharge, and thereby the surface to be machined is excessively cut. Accordingly, the small recessed portion 507 is formed at the crossing point 504 to cause degradation in the machining precision.

A method of solving such a problem in terms of the power supply includes a method of decreasing a machining removal amount at the crossing point 504. More specifically, when the wire electrode 505 is located in the vicinity of the crossing point 504, the discharge stop time may be elongated. However, as explained above, when only the discharge stop time is shortened, the drive speed is decreased as the inter-pole voltage lowers, and the wire electrode 505 stays near the crossing point 504 for a long period of time. As a result, the small recessed portion 507 is not eliminated disadvantageously.

The fourth embodiment is provided to solve the problem, that is, to elongate the discharge stop time and correct the inter-pole voltage so as to be increased when the wire electrode 505 reaches near the crossing point 504. According to the wire electric-discharge machining method of the fourth embodiment, the machining removal amount per unit time can be decreased by elongating the discharge stop time without decreasing the speed of relative movement between the wire electrode 505 and the workpiece 506. Thus, it is possible to effectively prevent formation of the small linear recessed portion 507 at the crossing point 504 between the contour forming path 501 of the wire electrode 505 and the approach path 503 reaching the contour forming path 501 in the workpiece 506.

The same method as explained above is also applied to an outside corner portion and an inner corner portion of a sharp edge. In these cases, since the wire electrode 505 stays at the corner portion for a long period of time, a machining removal amount becomes excessive and thereby a desired shape cannot be obtained. Therefore, when the wire electrode 505 reaches near the corner portion, the discharge stop time is elongated, and correction is performed so that the inter-pole voltage is increased. According to the wire electric-discharge machining method, the machining removal amount per unit time can be decreased by elongating the discharge stop time without decreasing the speed of relative movement between the wire electrode 505 and the workpiece 506. For this reason, it is possible to effectively prevent the case in which sags may occur at the outside corner portion or the inner corner portion of the sharp edge in the workpiece 506.

According to one aspect of this invention, when the discharge stop time becomes long, correction is performed by the inter-pole voltage correction unit so that the voltage corresponding to an inter-pole voltage increases. The wire electrode and the workpiece relatively move according to the corrected voltage corresponding to the inter-pole voltage. Thus, it is possible to precisely control the machining removal amount in finishing and thereby improve machining precision.

Moreover, a value obtained by canceling an increase/decrease of the discharge stop time can be set as the corrected voltage corresponding to an inter-pole voltage, and it is thereby possible to more precisely control the machining removal amount in finishing.

Furthermore, the voltage corresponding to an inter-pole voltage can be corrected by a correction coefficient calculated based on a measured value in advance. Thus, it is possible to more precisely control the machining removal amount in finishing regardless of the capacitance of a cable and a machining power supply.

Moreover, in the power supply having a constant discharge time, a value obtained by canceling an increase/decrease in the discharge stop time can be set as the corrected voltage corresponding to an inter-pole voltage Thus, it is possible to precisely control the machining removal amount in finishing even though the power supply having a constant discharge time is applied, and thereby improve the machining precision.

According to another aspect of this invention, the machining removal amount per unit time can be decreased by elongating the discharge stop time without decreasing the speed of relative movement between the wire electrode and the workpiece. Thus, even though the machining removal amount is partially decreased in the workpiece, the machining precision can be improved.

According to still another aspect of this invention, it is possible to decrease the machining removal amount per unit time at the crossing portion between the contour forming path of the wire electrode and the approach path reaching the contour forming path in the workpiece by elongating the discharge stop time without decreasing the speed of relative movement between the wire electrode and the workpiece. Thus, it is possible to prevent formation of a linear recessed portion at the crossing portion between the contour forming path of the workpiece and the approach path reaching the contour forming path.

According to still another aspect of this invention, the machining removal amount per unit time can be decreased by elongating the discharge stop time without decreasing the speed of relative movement between the wire electrode and the workpiece. Thus, the case in which sags may occur at a corner portion of the workpiece can be prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A wire electric-discharge machining apparatus comprising:
   a control unit which determines a speed of relative movement between a wire electrode and a workpiece based on a voltage corresponding to an inter-pole voltage between the wire electrode and the workpiece;
   a machining unit which generates a discharge between the wire electrode and the workpiece and relatively moves the wire electrode and the workpiece at the speed of relative movement determined by said control unit to process the workpiece; and
   an inter-pole voltage correction unit which corrects the voltage corresponding to the inter-pole voltage according to a correction coefficient which increases depending on an increase in discharge stop time,
   wherein the corrected voltage corresponding to the inter-pole voltage output from said inter-pole voltage correction unit is given to said control unit to relatively move the wire electrode and the workpiece according to the corrected voltage corresponding to the inter-pole voltage.

2. The wire electric-discharge machining apparatus according to claim 1, wherein said inter-pole voltage correction unit multiplies the voltage corresponding to the inter-pole voltage by a ratio of the discharge stop time with respect to a pulse width of the voltage corresponding to the inter-pole voltage, and adds the multiplication result to the voltage corresponding to the inter-pole voltage to give the addition result to said control unit.

3. The wire electrode machining apparatus according to claim 1, further comprising a table in which the discharge stop time and a pre-calculated correction coefficient of the voltage corresponding to the inter-pole voltage correspond to each other,
   wherein said inter-pole voltage correction unit outputs the corrected voltage corresponding to the inter-pole voltage with reference to the table, when the voltage corresponding to the inter-pole voltage and the discharge stop time are given to said inter-pole voltage correction unit.

4. The wire electric-discharge machining apparatus according to claim 1, wherein the correction coefficient of the voltage corresponding to the inter-pole voltage is determined based on a rate of the discharge stop time in a unit measurement time.

5. A wire electric-discharge machining method comprising the steps of:
   Generating discharge between a wire electrode and a workpiece;
   determining a speed of relative movement based on a voltage corresponding to an inter-pole voltage between the wire electrode and the workpiece;
   relatively moving the wire electrode and the workpiece at the speed of relative movement to process the workpiece;
   elongating a discharge stop time when a machining removal amount is partially reduced; and
   correcting the voltage corresponding to the inter-pole voltage depending on the elongated discharge stop time.

6. The wire electric-discharge machining method of claim 5, further comprising:
   calculating an average voltage, wherein a voltage during the discharge stop time is not included in said calculating of the average voltage.

7. The wire electric-discharge machining method of claim 5, further comprising:
   pre-storing a table that includes values for a discharge stop time, a detected voltage, a calculated coefficient, a corrected voltage and a drive speed;
   outputting the corrected voltage corresponding to the inter-pole voltage with reference to the pre-stored table.

8. The wire electric-discharge machining method of claim 5, further comprising:
   measuring the discharge stop time; and
   calculating a correction voltage based on the measured discharge stop time.

9. A wire electric-discharge machining method comprising the steps of:
   generating discharge between a wire electrode and a workpiece;
   determining a speed of relative movement based on a voltage corresponding to an inter-pole voltage between the wire electrode and the workpiece;
   relatively moving the wire electrode and the workpiece at the speed of relative movement to process the workpiece;
   elongating a discharge stop time at a crossing portion between a contour forming path of the wire electrode in the workpiece and an approach path reaching the contour forming path in comparison with another portion; and
   correcting the voltage corresponding to the inter-pole voltage depending on the elongated discharge stop time.

10. The wire electric-discharge machining method of claim 9, further comprising:
    measuring the discharge stop time; and
    calculating a correction voltage based on the measured discharge stop time.

11. The wire electric-discharge machining method of claim 9, further comprising:
    calculating an average voltage, wherein a voltage during the discharge stop time is not included in said calculating of the average voltage.

12. The wire electric-discharge machining method of claim 9, further comprising:
    pre-storing a table that includes values for a discharge stop time, a detected voltage, a calculated coefficient, a corrected voltage and a drive speed;

outputting the corrected voltage corresponding to the inter-pole voltage with reference to the pre-stored table.

13. A wire electric-discharge machining method comprising the steps of:

generating a discharge between a wire electrode and a workpiece;

determining a speed of relative movement based on a voltage corresponding to an inter-pole voltage between the wire electrode and the workpiece;

relatively moving the wire electrode and the workpiece at the speed of relative movement to process the workpiece;

elongating a discharge stop time at a corner portion of the workpiece in comparison with another portion; and correcting the voltage corresponding to the inter-pole voltage depending on the elongated discharge stop time.

14. The wire electric-discharge machining method of claim 9, further comprising:

measuring the discharge stop time; and calculating an average voltage, wherein a voltage during the discharge stop time is not included in said calculating of the average voltage.

15. The wire electric-discharge machining method of claim 13, further comprising:

pre-sorting a table that includes values for a discharge stop time, a detected voltage, a calculated coefficient, a corrected voltage and a drive speed;

outputting the corrected voltage corresponding to the inter-pole voltage with reference to the pre-sorted table.

16. The wire electric-discharge machining method of claim 13, further comprising:

measuring the discharge stop time; and calculating a correction voltage based on the measured discharge stop time.

* * * * *